United States Patent [19]

Kambara et al.

[11] 4,141,047
[45] Feb. 20, 1979

[54] METHOD AND APPARATUS FOR CORRECTING TRACKING ERRORS OF A TRANSDUCER WHICH SCANS PARALLEL RECORD TRACKS

[75] Inventors: Masahiro Kambara; Minoru Morio, both of Tokyo; Hidehiko Okada, Yokohama; Yukio Kubota, Tokyo, all of Japan

[73] Assignee: Sony Corporation, Tokyo, Japan

[21] Appl. No.: 832,368

[22] Filed: Sep. 12, 1977

[51] Int. Cl.² .................. G11B 21/10; G11B 5/52; G11B 21/24

[52] U.S. Cl. .................. 360/77; 360/107; 360/109; 360/84

[58] Field of Search ................ 360/77–78, 360/69–71, 75–76, 84, 131, 134, 27, 64, 109, 107; 358/4

[56] References Cited

U.S. PATENT DOCUMENTS

| | | | |
|---|---|---|---|
| 3,215,772 | 11/1965 | Kirara | 360/70 |
| 3,526,726 | 9/1970 | Corbett et al. | 360/109 |
| 3,585,291 | 6/1971 | Yamakawa | 360/77 |
| 3,663,764 | 5/1972 | Trost et al. | 360/70 |
| 3,787,616 | 1/1974 | Falk | 360/75 |
| 3,838,453 | 9/1974 | Buslik et al. | 360/77 |
| 4,014,040 | 3/1977 | Kornhaas | 360/77 |
| 4,044,388 | 8/1977 | Metzger | 360/77 |
| 4,056,832 | 11/1977 | de Boer et al. | 360/77 |
| 4,080,636 | 3/1978 | Ravizza | 360/77 |

FOREIGN PATENT DOCUMENTS 49-84617  8/1974  Japan.

OTHER PUBLICATIONS

IBM Tech. Disc. Bull., Price, Video Tape Recorder with Oscillating Head, vol. 12, No. 1, Jun. 1969, pp. 33-34.

*Primary Examiner*—Alfred H. Eddleman
*Attorney, Agent, or Firm*—Lewis H. Eslinger; Alvin Sinderbrand

[57] ABSTRACT

A method and apparatus for correcting tracking errors of a transducer which scans successive, parallel, adjacent record tracks of a record medium so as to reproduce information signals therefrom. The information signals, which may comprise video signals, are recorded in the parallel record tracks, and predetermined signals also are recorded at predetermined locations in the information signals. When the information and predetermined signals are played back, at least one cross-talk predetermined signal which is recorded in at least one adjacent track also is played back. The cross-talk predetermined signal is detected and a control signal is produced in response to the level of the detected cross-talk predetermined signal. The position of the transducer with respect to the track being scanned thereby is adjusted in accordance with the control signal. In one embodiment, the control signal is recorded at a predetermined location in each horizontal blanking interval of the video signals; and the horizontal blanking intervals which are recorded in one track are displaced with respect to the horizontal blanking intervals which are recorded in the adjacent track. This displacement of the horizontal blanking intervals, and thus the predetermined signals, in adjacent tracks facilitates the detection of the cross-talk predetermined signals which, for example, may comprise pilot signals.

24 Claims, 22 Drawing Figures

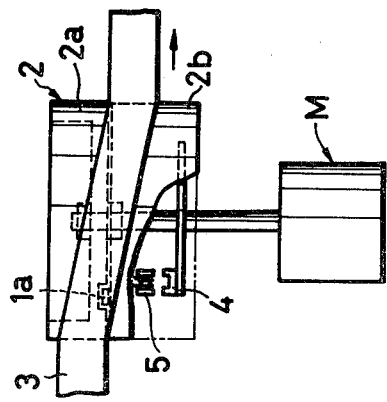
FIG.1A PRIOR ART
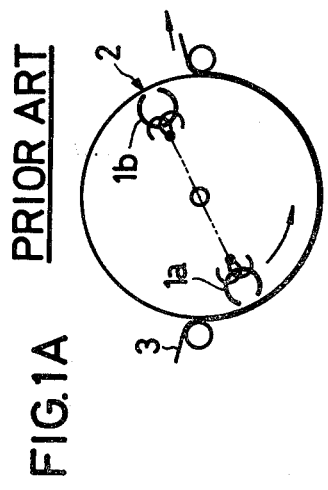
FIG.1B PRIOR ART
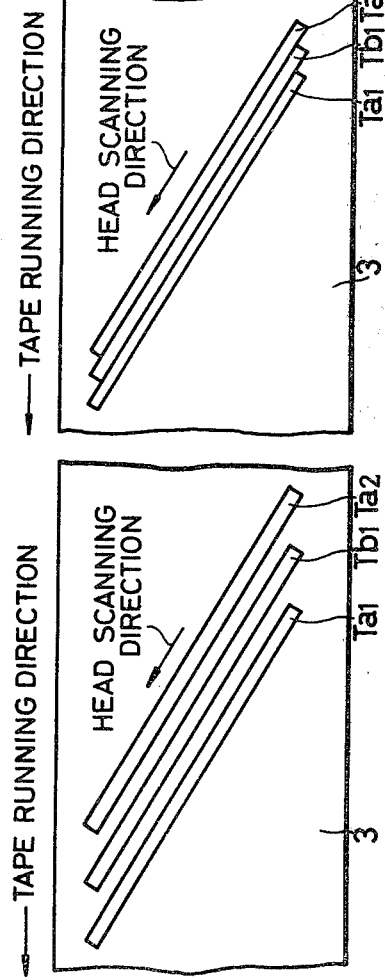
FIG.2A PRIOR ART
FIG.2B PRIOR ART

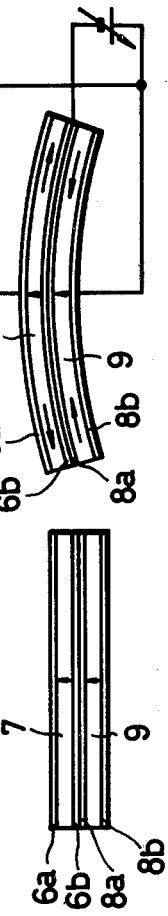
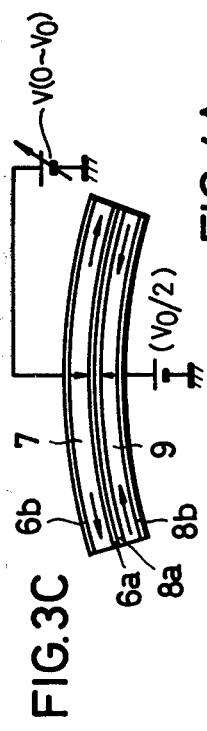
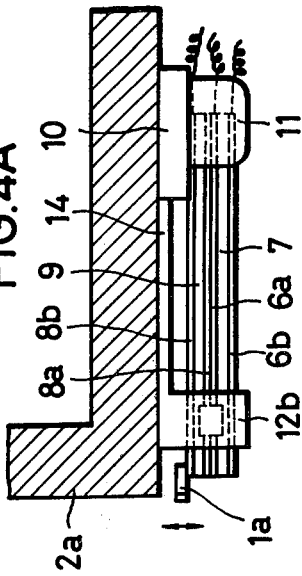
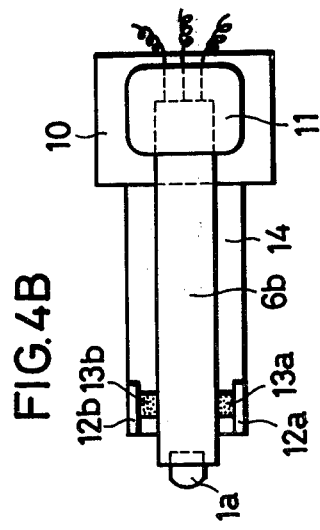

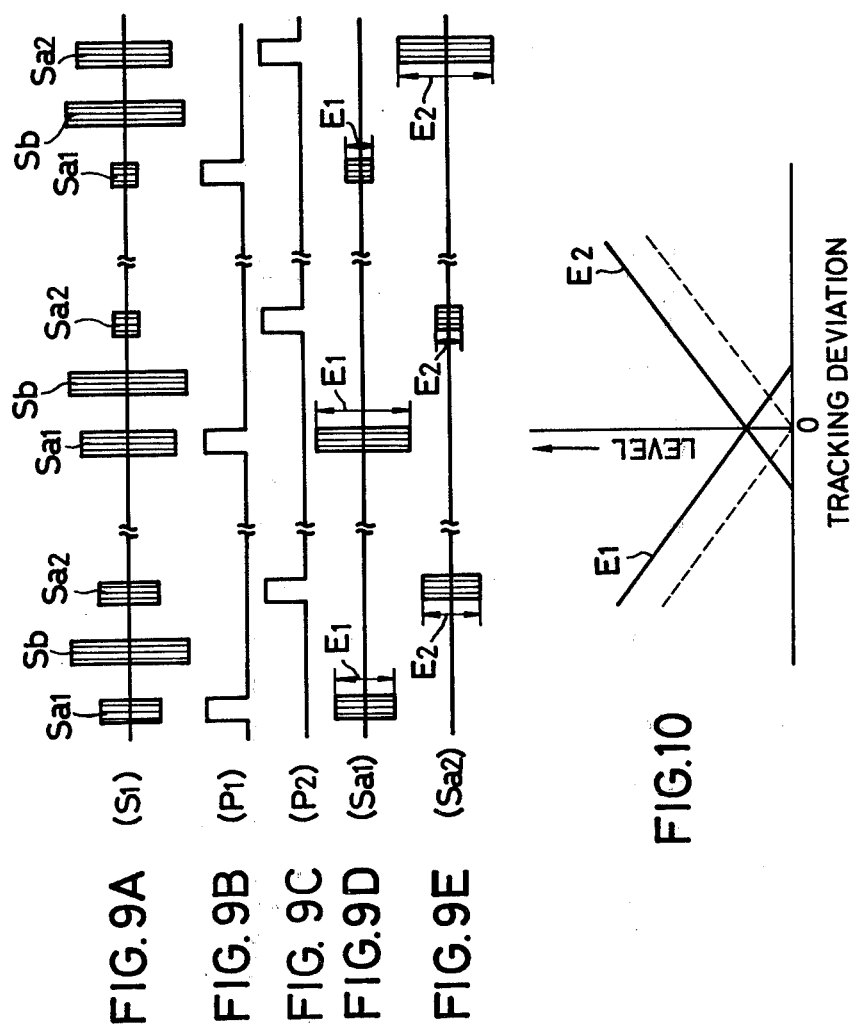

METHOD AND APPARATUS FOR CORRECTING TRACKING ERRORS OF A TRANSDUCER WHICH SCANS PARALLEL RECORD TRACKS

BACKGROUND OF THE INVENTION

This invention relates to a method and apparatus for correcting tracking errors in a transducer which scans successive, parallel tracks of a record medium and, more particularly, to such a method and apparatus wherein the position of the transducer relative to the track being scanned can be adjusted when a tracking error condition is sensed.

Signal recording and/or reproducing apparatus are known wherein the rotary head assembly scans successive parallel tracks on a record medium so as to record signal information by scanning the record medium with the rotary head or heads. The record medium generally used in such apparatus is magnetic tape, magnetic sheets, magnetic discs and various other types of media. In addition to rotating the head or heads across the record medium, the medium also is moved. One particular use of such apparatus is to record video signal information on, for example, magnetic tape, wherein parallel slant tracks are recorded in skewed relation to the longitudinal axis of the tape. In addition to video signal information, such apparatus is capable of recording other types of analog signals or, if desired, digital signals representing various types of information. In the interest of simplification, the following explanation and description refers to video signal recorders which use magnetic tape, such as the video tape recorder (VTR). However, it should be understood that this explanation and description also is applicable to different types of recording apparatus (such as other types of analog or digital recorders) which use different media.

A typical VTR includes one, and preferably two, record/playback heads mounted on a suitable rotary assembly so as to rotatably scan a magnetic tape which is helically wrapped about at least a portion of a guide drum. During recording, a tracking servo system synchronizes the movement of the tape to the rotary movement of the heads, and control signals which can be used for this type of synchronism during a reproducing operation are recorded on the tape. Hence, during reproduction, this same servo control system is used to synchronize the movement of the tape to the rotation of the heads. Consequently, a generally accurate video picture can be displayed in response to the reproduced video signals. That is, this servo control system is operative to control the relative movement between the rotary heads and the tape such that each head scans substantially the same track during reproduction as was scanned during recording.

However, even with this servo control system, there are instances wherein the path traversed by the heads during reproduction does not coincide satisfactorily with the recorded record track. This is particularly true when the video signals are recorded by one VTR and are reproduced from the tape by a different VTR. If the orbits of the magnetic heads in these different VTR's are not equal to each other, the servo control system may not be effective to bring the heads into coincidence with the recorded tracks during reproduction. Other factors also may be present which prevent successful operation of the servo control system. Consequently, the scanning magnetic heads may exhibit tracking errors during reproduction.

The tracking errors mentioned above may not be particularly noticeable or objectionable for VTR apparatus wherein parallel tracks are recorded with guard bands separating adjacent tracks or when the magnetic tape is transported at a sufficiently higher speed. However, the problems caused by these tracking errors during signal reproduction may not be accceptable if the guard bands between adjacent tracks are reduced and if the speed at which the magnetic tape is transported is reduced. The desirable effect of eliminating the guard bands, and thus increasing the recording density (tracks per inch), and of reducing the transport speed of the magnetic tape is to increase the amount of video signal information which can be recorded on a magnetic tape of given lengths. This, in turn, increases the recording capacity (generally expressed as a measure of time) of the VTR without requiring a concommitant increase in the supply or length of recording tape. In particular, for these so-called "longer-playing" VTR's, tracking errors may reduce the signal-to-noise ratio and may otherwise deleteriously affect the reproducing characteristics.

OBJECTS OF THE INVENTION

Therefore, it is an object of the present invention to provide an improved method and apparatus for correcting tracking errors which may occur in rotary head recording/reproducing apparatus.

Another object of this invention is to provide a method and apparatus for correcting tracking errors in a rotary head recording/reproducing system so as to correct for deviations between the scanning path of a head and a record track on the record medium.

A further object of this invention is to provide a method and apparatus for correcting tracking errors in a rotary head recording/reproducing system wherein the scanning path of the rotary head is adjusted so as to coincide with a previously recorded track.

An additional object of this invention is to provide a method and apparatus for correcting tracking errors of a scanning head which traverses a scanning path that may deviate from a desired path, this deviation being corrected by displacing the support member upon which the head is mounted during the scanning operation.

Yet another object of this invention is to correct for tracking errors which may occur in a video signal reproducing device wherein a playback head may deviate from a record track on a record medium having parallel, adjacent record tracks.

A still further object of this invention is to provide a method and apparatus for controlling the scanning of a record track by a scanning head during a reproducing operation so as to avoid deleterious effects upon the reproduced signals.

Another object of this invention is to provide a method and apparatus for recording particular signals on a record medium in a video signal recorder, which signals are detected and used during a reproducing operation to correct for tracking errors of the reproducing transducers in, for example, a long-playing video recorder.

Various other objects, advantages and features of the present invention will become readily apparent from the ensuing detailed description, and the novel features will be particularly pointed out in the appended claims.

SUMMARY OF THE INVENTION

In accordance with the present invention, predetermined signals are recorded in successive tracks of a record medium such that when these predetermined signals are reproduced, as by a rotary transducer, tracking errors of that transducer may be easily corrected such that the transducer accurately scans a record track. The record medium is provided with parallel, adjacent record tracks in which information signals and the aforementioned predetermined signals are recorded. During a reproducing operation, at least one cross-talk predetermined signal which is recorded in at least one adjacent track is reproduced. This cross-talk predetermined signal is detected and a control signal is produced in response to the level of the detected cross-talk predetermined signal. The position of the scanning transducer is adjusted with respect to the track being scanned in accordance with the control signal. In one embodiment, the information signals are video signals having periodic horizontal blanking intervals recorded in each record track. The horizontal blanking intervals in a given track are displaced from the horizontal blanking intervals in an adjacent track in the direction of scanning. This displacement facilitates the detection of the cross-talk predetermined signals which are recorded in predetermined locations of the horizontal blanking intervals.

BRIEF DESCRIPTION OF THE DRAWINGS

The following detailed description, given by way of example, will best be understood in conjunction with the accompanying drawings in which:

FIG. 1A is a schematic top view of rotary head recording/reproducing apparatus;

FIG. 1B is a schematic side view of the apparatus shown in FIG. 1A;

FIG. 2A represents parallel tracks on a record medium having guard bands between adjacent tracks;

FIG. 2B represents parallel tracks on a record medium wherein successive tracks are adjacent each other;

FIGS. 3A-3C are schematic side views of a piezoelectric support member which can be used with the present invention;

FIG. 4A is a side view of one embodiment of a head support assembly which can be used with the present invention;

FIG. 4B is a bottom view of the assembly shown in FIG. 4A;

FIGS. 9A-9E are waveform diagrams which are useful in understanding the operation of the apparatus shown in FIG. 8; and FIG. 10 is a graphical representation showing the relationship between tracking errors and particular signals which are produced by components of the apparatus shown in FIG. 8.

DETAILED DESCRIPTION OF CERTAIN PREFERRED EMBODIMENTS

Figure 5:
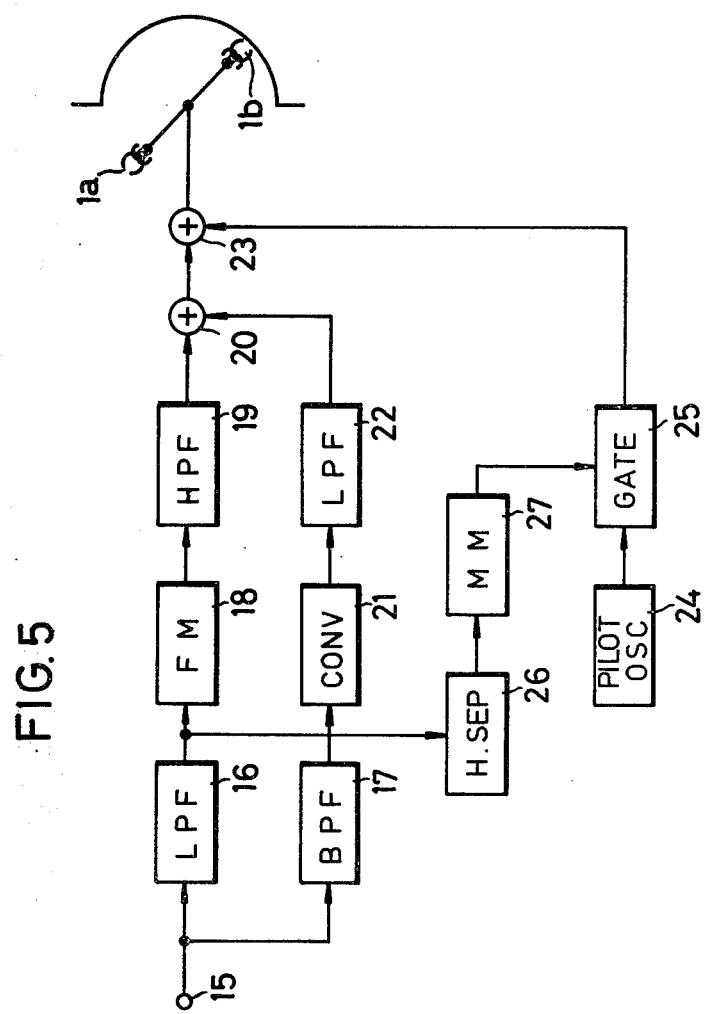
FIG. 5 is a block diagram of video signal recording apparatus which can be used to record tracking-error correcting signals.

The following detailed description, given by way of example, will best be understood in conjunction with the accompanying drawings. For the purpose of simplification, and in order to facilitate an understanding of the present invention, the following description is limited to the environment of a video signal recorder and, more particularly, to a VTR. However, it will become readily apparent that the present invention can be used in other types of signal recorders, such as analog or digital recorders wherein moving heads scan a record medium. Furthermore, although the record medium described herein is, illustratively, magnetic tape, it should be readily apparent that other types of record media, such as magnetic sheets, magnetic discs, and the like can be used.

Turning now to FIG. 1A, there is schematically illustrated a top view of a typical rotary head scanning device, such as a VTR. As is conventional, this device is formed with two magnetic record/playback heads 1a, 1b (hereinafter, merely heads) which are adapted for rotation about a central axis. A guide drum 2 is adapted to receive a record medium, such as tape 3, wrapped helically thereabout for at least 180°. Heads 1a and 1b may be mounted on diametrically opposed arms which are rotated to as to scan successive, parallel, skewed tracks across tape 3. Alternatively, heads 1a and 1b may be mounted on a portion of the guide drum, which portion is adapted to be rotated so as to serve the dual purpose of guiding tape 3 therebout and rotating heads 1a and 1b so as to scan parallel tracks across the tape. Thus, the heads rotate in the direction indicated by the arrow while tape 3 is advanced so as to record signal information thereon.

If, as shown in FIG. 1B, guide drum 2 is formed of two drums 2a, 2b, disposed in face-to-face configuration and spaced apart so as to define a scanning gap therebetween, tape 3 is helically wrapped about a portion of the surface of the guide drum and heads 1a, 1b which are supported by, for example, drum 2a, are rotated to scan parallel tracks across the tape. Although FIG. 1A shows the preferred scanning apparatus wherein two heads are used, it is possible that only a single head may be provided. Nevertheless, if two heads are used, alternate tracks are recorded thereby such that first one track is recorded by head 1a and then the next adjacent track is recorded by head 1b, and then the following track is recorded by head 1a, and so on.

During a signal reproducing operation, the relative speed of tape 3 with respect to heads 1a and 1b is the same as during a signal recording operation. A suitable servo control system (not shown) is provided to account for relatively small changes in tape-drive and head-drive motor speeds, tape shrinkage, tape stretching, differences from the recording apparatus to the reproducing apparatus, and the like. To this effect, a head-position generator 5 is provided to generate pulses when heads 1a, 1b rotate into predetermined position, such as when head 1a first contacts tape 3. A magnetic element 4 is secured to the rotary drive shaft which is used to rotate heads 1a, 1b so as to rotate relative to head-position generator 5 while the heads rotate. Head-position generator 5 may comprise a magnetic pick-up sensor for generating a position detecting pulse when magnetic element 4 rotates therepast. In a typical video recording device, each head records a complete field in a respective record track, and heads 1a, 1b are rotated at a speed of 30 rps. Consequently, the position detecting pulses generated by pick-up sensor 5 have a frequency of 30 Hz.

As shown in FIG. 2A, video signals are recorded by heads 1a, 1b in parallel slant tracks Ta1, Tb1, Ta2, ... As one example, head 1a records alternate tracks Ta1, Ta2, ...; and head 1b records the remaining alternate tracks Tb1, Tb2, ... In a typical VTR, each track Ta1, Tb1, ... has a field of video signals recorded therein such that a plurality of horizontal line intervals separated by horizontal blanking intervals is recorded in each track. During a reproducing operation, heads, such as heads 1a, 1b, scan the parallel record tracks, Ta1, Tb1, ... so as to reproduce the previously recorded video signals. The aforementioned servo control system adjusts the relative speed of tape 3 and heads 1a, 1b such that the scanning path traversed by the heads substantially coincides with the respective record tracks. However, the servo control system may not be sufficient to achieve precise coincidence between the scanning path and record tracks. This means that the head will not be aligned precisely with a record track and, therefor, will include a portion of its air gap which extends beyond the longitudinal margins of the track. For the embodiment wherein tracks Ta1, Tb1, ... are spaced from each other by guard bands, as shown in FIG. 2A, this lack of coincidence between the path traversed by the scanning head and the record track may not produce noticeable deterioration in the video picture which ultimately is reproduced. However, if the information density of the magnetic tape is increased, as by recording parallel, adjacent record tracks without separating guard bands therebetween, and by reducing the transport speed of tape 3, the problem of imprecise coincidence between the path or trace of the scanning head and each adjacent record track is noticeable. That is, if the scanning head deviates significantly from the record track, undesired cross-talk signals are picked up from the adjacent track. These cross-talk signals may interfere with the video picture which ultimately is reproduced. Furthermore, tracking errors of this type may reduce the signal-to-noise ratio, thus degrading the quality of the reproduced video picture.

As a numerical example of the foregoing, the width of each record track shown in FIG. 2A may be 30 microns. Similarly, the width of each guard band also may be 30 microns. Hence, the track pitch is 60 microns. Now, if the tape transport speed is reduced to one third of the speed used to record the record tracks shown in FIG. 2A, the successive parallel tracks will be adjacent each other as shown in FIG. 2B. Although the inclination of the parallel tracks shown in FIG. 2B closely resembles the inclination shown in FIG. 2A, because of the much higher rotary speed of the heads relative to the transport speed of the tape in both examples, it may be appreciated that the track pitch in FIG. 2B is reduced to one third the pitch shown in FIG. 2A. That is, the track pitch, or width of each record track, shown in FIG. 2B is 20 microns. If the size of the reproducing head used to reproduce the video signals recorded in the tracks shown in FIG. 2A is equal to the size of the reproducing head used to reproduce the signals recorded in the tracks shown in FIG. 2B, then the gap length is 30 microns. Preferably, when this head is used with the record tape shown in FIG. 2B, the scanning path of the head must be controlled so as to scan only a 10 micron width portion of adjacent record tracks. That is, if head 1b scans track Tb1 during a reproducing operation, this head must scan only a 5 micron portion of track Ta1 and only a 5 micron portion of track Ta2. If the scanning path or trace of head 1b deviates from the foregoing limitations, interference due to cross-talk from the adjacent record tracks (tracks Ta1, Ta2) tends to deteriorate the video picture which is reproduced.

As mentioned above, the usual servo control system provided with VTR's of the type shown in FIGS. 1A and 1B may not be capable of controlling the scanning trace of the heads within the aforenoted limitations. It is one purpose of the present invention to provide an adjustable support assembly for heads 1a, 1b so that the scanning traces of these heads can be adjusted so as to correct the tracking errors which may not be fully compensated by the usual servo control system. A preferred embodiment of such an adjustable head support assembly is formed of piezo-electric material which is responsive to a voltage applied thereto so as to bend or deflect accordingly. Thus, if heads 1a and 1b are supported by such piezo-electric material, the controlled deflection thereof can be used to compensate for such tracking errors.

One type of head support assembly which can be used with the present invention is shown schematically in FIGS. 3A–3C. This assembly is formed of a pair of leaf members 7 and 9, each being constructed of piezo-electric material whose directions of polarization are represented by the illustrated arrows. The opposite surfaces of piezo-electric leaf member 7 are plated with electrodes 6a and 6b, respectively; and the opposite surfaces of piezo-electric leaf member 9 likewise are plated with electrodes 8a and 8b, respectively. When piezo-electric leaf members 7 and 9 overlie each other such that electrodes 6b and 8a are in contact, the assembly will deflect if a variable voltage is applied across the respective members. For example, and as shown in FIG. 3B, if voltages are applied to the electrodes in the manner shown, then piezo-electric leaf member 7 tends to expand in its lengthwise direction while piezo-electric leaf member 9 tends to compress. As a result of these oppositely-acting forces, the illustrated head support assembly bends, or deflects, by an amount which is a function of the strength of the electric field applied across each member. The variable voltage source thus represents that a variable electric field can be applied across members 7 and 9 so as to adjustably deflect the head support assembly. If the polarity of this electric field is reversed, the direction in which the assembly bends, or deflects, correspondingly is reversed.

The head support assembly comprised of the pair of piezo-electric leaf members having respectively opposite surfaces plated with electrodes hereinafter is referred to as a bi-morph leaf or bi-morph assembly.

If the direction of polarization of the piezo-electric members is made opposite to each other, that is, if electrode 6a of leaf member 7 now contacts electrode 8a of leaf member 9, the manner in which voltage is applied to the bi-morph assembly to effect a displacement thereof is as shown in FIG. 3C. Hence, a voltage need not be applied to the electrodes which are in common contact with each other, as in the FIG. 3B embodiment. Instead, if a bias voltage, for example, $V_o/2$ is applied to electrode 8b and if a variable voltage V is applied to electrode 6b, then the illustrated bi-morph assembly will bend in a downward direction if the variable voltage V is less than the bias voltage $V_o/2$. Conversely, the bi-morph assembly will bend in an upward direction if variable voltage V exceeds bias voltage $V_o/2$. It can be assumed that variable voltage V is variable over a range from zero to $V_o$ volts.

A practical embodiment of a head support assembly formed of a bi-morph leaf is illustrated in FIGS. 4A and 4B, which are side and bottom views, respectively. In FIG. 4A, it is assumed that the head support assembly is mounted on the lower surface of upper, rotatable guide drum 2a (FIG. 1B). The head support assembly includes a mounting base 10 adapted to receive the bi-morph composite assembly which may be secured to this mounting base by a suitable adhesive 11. The bi-morph assembly extends outward from the base toward the periphery of guide drum 2a, and magnetic head 1a or 1b is mounted on the free end of the bi-morph assembly.

Preferably, damping members 13a and 13b are provided to damp free or resonant oscillation of the bi-morph assembly which may be caused by the forces exerted in response to the bending voltages applied to the respective electrodes. Damping members 13a and 13b are attached to tabs 12a and 12b, respectively, these tabs extending from a damping member mounting plate 14 which, as shown, extends outwardly from base 10. Damping action is achieved when the damping members are pressed between the sides of the bi-morph assembly and tabs 12a and 12b with suitable force to prevent oscillation but not so great as to prevent deflection of the bi-morph assembly in response to the drive voltage applied thereto. As also shown, conducting leads are secured to the respective electrodes of the bi-morph assembly for receiving the drive or deflecting voltage.

In accordance with the present invention, the drive voltage which is applied to the bi-morph assembly is produced during a reproducing operation. This drive voltage represents the deviation of the scanning trace of head 1a, 1b from the previously recorded track. The extent of this deviation is determined by detecting the magnitude of a cross-talk component which is picked up by the scanning transducer from a track adjacent the particular track which is scanned. For example, and with reference to FIG. 2B, if head 1b scans track Tb1, the deviation between the scanning trace of this head and track Tb1 can be represented by the level of a cross-talk signal picked up from track Ta1 and/or track Ta2. It is one aspect of the present invention to record a predetermined signal, such as a pilot signal, together with the video signals which normally are recorded in each track so that, during a reproducing operation, a cross-talk component of the predetermined, or pilot signal can be detected and used as an indication of the extent of a tracking error.

Referring to FIG. 5, there is illustrated therein a block diagram of video signal recording apparatus which can be used to record both a video signal and a predetermined, or pilot signal on the recording medium. The illustrated recording apparatus is capable of recording both monochrome (black-and-white) video signals and color video signals on the record medium. For the purpose of the present discussion, it will be assumed that this apparatus is supplied with a composite color video signal, including luminance and chrominance components, and the usual synchronizing signals, for recording. In one embodiment, the recording apparatus is comprised of a luminance signal channel, formed of a low-pass filter 16, frequency modulator 18 and high-pass filter 19, and a chrominance signal channel formed of a band-pass filter 17, frequency converter 21 and low-pass filter 22. As is conventional, the respective circuits in each of the aforementioned channels are connected in series for the purpose of separating the luminance and chrominance signals from each other, and then frequency-modulating the separated luminance signals to a higher frequency band while frequency-converting the chrominance signals to a lower frequency band. These band-separated signals are combined in an adding circuit 20 to be supplied to heads 1a, 1b for recording on the record medium. In an alternative embodiment of recording apparatus, the composite color video signal may be supplied, through suitable filtering and amplifying circuits, to a frequency modulator, and the frequency-modulated composite color video signal then may be recorded on the medium.

A pilot signal oscillator 24 is provided to generate a pilot signal having a predetermined frequency $f_p$. If the recording apparatus is of the illustrated type wherein a frequency-modulated luminance signal and a frequency-converted chrominance signal are combined for simultaneous recording, the frequency $f_p$ of the pilot signal generated by pilot signal oscillator 24 preferably is less than the band of frequency-modulated luminance signals and is capable of being detected or discriminated from the frequency-converted chrominance signals. Pilot signal oscillator 24 is coupled through a gate circuit 25 to an adding circuit 23. Gate circuit 25 is responsive to a gating signal applied thereto so as to transmit a predetermined duration of pilot signal to adding circuit 23. It is one feature of the illustrated recording apparatus to record the pilot signal only during predetermined times of the video signal. Preferably, and in order to insure that the pilot signal will not interfere with the video signal during a reproducing operation, the pilot signal is recorded during a certain portion of the horizontal blanking interval. For this purpose, the gating signal applied to gate circuit 25 is derived from the horizontal synchronizing signal included in the composite color video signal. Accordingly, a horizontal synchronizing separator circuit 26 is connected to separate the horizontal synchronizing signal from the composite color video signal. As shown, horizontal synchronizing separator circuit 26 is coupled to the output of low-pass filter 16. The separated horizontal synchronizing signal is applied to a monostable multivibrator 27 to trigger the latter for generating a gating signal which, in turn, is applied to gate circuit 25.

Figure 6A:
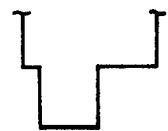
FIGS. 6A-6D are waveform diagrams which are useful in understanding the operation of the apparatus shown in FIG. 5.
Figure 6B:
Figure 6C:
Figure 6D:
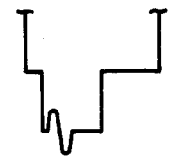

In operation, the luminance and chrominance signal channels operate in conventional manner and, therefore, need not be further described. Horizontal synchronizing separator circuit 26 also operates in a conventional manner so as to separate the horizontal signal, shown in FIG. 6A, from the composite color video signal which is applied to input terminal 15. The separated horizontal synchronizing signal triggers monostable multivibrator 27 to produce a gating pulse of limited duration as shown in FIG. 6C. The pilot signal, shown in FIG. 6B, is supplied from pilot signal oscillator 24 to gate circuit 25 and is gated through the gate circuit during the interval of the gating pulse of FIG. 6C. Accordingly, the pilot signal is supplied to adding circuit 23 during a predetermined portion of the horizontal blanking interval, such as during an initial portion of the horizontal synchronizing pulse, as shown in FIG. 6D. The gated pilot signal is combined with the frequency-modulated luminance signal and the frequency-converted chrominance signal for recording on the record medium by heads 1a and 1b during alternate scans of the medium. In one embodiment, this pilot signal is recorded during each horizontal blanking interval. However, if desired, the pilot signal may be recorded during selected horizontal blanking intervals. Thus, in successive, adjacent parallel tracks, a pilot signal is recorded at predetermined locations, i.e., during a selected portion of the horizontal blanking interval, of the horizontal line interval.

Figure 7:
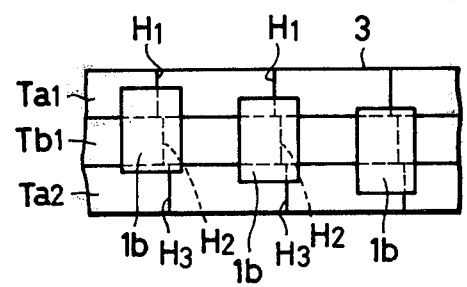
FIG. 7 represents different positions of a scanning transducer relative to the record tracks shown, for example, in FIG. 2B.

As mentioned above, one aspect of this invention is to utilize the cross-talk component of the recorded pilot signal which is picked up from adjacent tracks as an indication of the tracking error of the scanning transducer during a reproducing operation. As may be appreciated, if the horizontal blanking intervals in adjacent tracks all are in alignment in a direction tranversely of such tracks, there may be difficulty in discriminating between a cross-talk pilot signal and the pilot signal which is recovered from the track being scanned. This difficulty may be avoided if the pilot signal is of a different frequency for the different tracks. That is, if the pilot signal recorded by head 1a is of a frequency $f_{pa}$ and if the pilot signal recorded by head 1b is of a frequency $f_{pb}$, then suitable frequency detectors can be used to detect the cross-talk pilot signal during signal reproduction. In the preferred embodiment described herein, the frequency of the pilot signal is the same for all tracks. Therefore, in order to facilitate the detection of the cross-talk component of the pilot signal, the position of the horizontal blanking intervals which are recorded in one track is shifted or displaced with respect to the position of the horizontal blanking intervals recorded in an adjacent track. This is illustrated in FIG. 7 which shows tracks Ta1, Tb1 and Ta2, in which are recorded horizontal blanking intervals $H_1$, $H_2$ and $H_3$, respectively. As shown, these horizontal blanking intervals are not aligned. Rather, horizontal blanking intervals $H_2$ are displaced or shifted with respect to horizontal blanking intervals $H_1$, and horizontal blanking intervals $H_3$ are displaced, or shifted, with respect to horizontal blanking intervals $H_2$. This displacement or shifting of the horizontal blanking intervals relative to each other in successive, adjacent tracks, can be attained by suitably selecting the diameter of tape guide drum 2, by suitably selecting the transport speed of the magnetic tape, or by selecting other parameters in the VTR, as is well known. For example, in the NTSC system, one frame of video signals is formed of 525 horizontal line intervals. If a complete field is recorded in a record track, each track will include 262.5 horizontal line intervals. As shown in FIG. 2B, the beginning portion of one track is shifted relative to the beginning portion of an adjacent track because of the movement of the tape. If this displacement is equal to one-half of a horizontal line interval (0.5 H), then the parallel tracks are recorded with their horizontal blanking intervals aligned with each other in a direction transversely of the tracks. This is the so-called H alignment which is attained by suitably selecting the diameter of the tape guide drum, the transport speed of the tape, or other parameters. Hence, the displacement, or shifting of the horizontal blanking intervals, as shown in FIG. 7 can be achieved in accordance with the selection of one or more of these parameters. Preferably, the displacement of the horizontal blanking intervals, that is, the displacement between horizontal blanking interval $H_1$ and horizontal blanking interval $H_2$, as well as the displacement between horizontal blanking interval $H_2$ and horizontal blanking interval $H_3$ is such that, in this displacement interval, neither a chrominance signal nor a burst signal is recorded. That is, since the burst signal usually is provided during the back porch of the horizontal synchronizing pulse, the displacement between, for example, horizontal blanking interval $H_1$ and horizontal blanking interval $H_2$ is less than the distance between the leading portion of horizontal blanking interval $H_1$ and the beginning of the burst signal on the back porch of horizontal blanking interval $H_1$. A similar displacement is provided between horizontal blanking intervals $H_2$ and $H_3$. As will soon become apparent, this displacement enables the cross-talk components of the pilot signals to be detected and, furthermore, avoids interference which may be caused by cross-talk between the pilot signal recorded in one track and the burst or chrominance signals recorded in the adjacent track.

Figure 8:
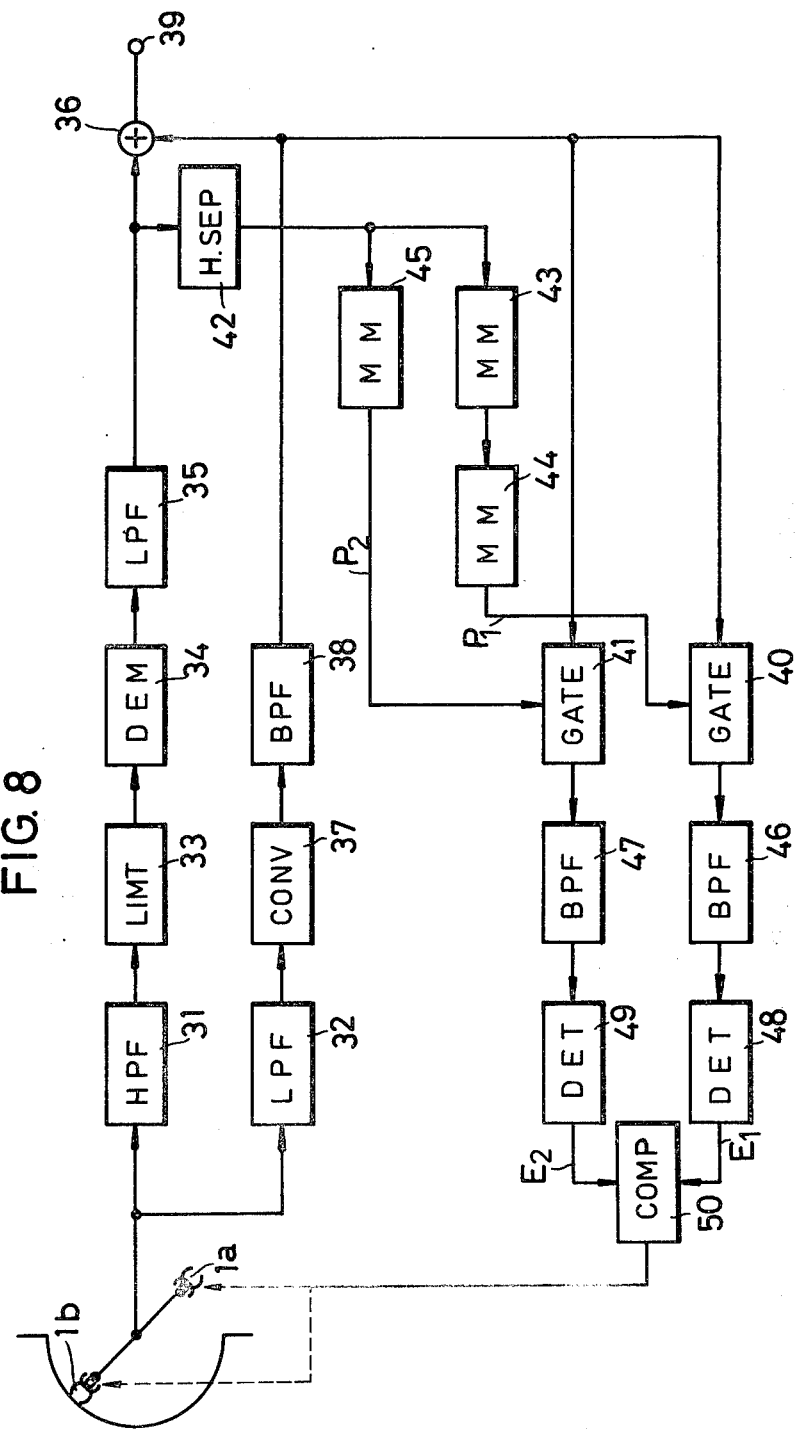
FIG. 8 is a block diagram of signal reproducing apparatus which can be used to correct tracking errors of a scanning transducer.

Turning now to FIG. 8, there is illustrated a block diagram of apparatus for reproducing the video signals recorded by the apparatus shown in FIG. 5 and for controlling the scanning trace of the reproducing head during reproduction. It will be assumed, for the purpose of the present discussion, that the horizontal blanking intervals recorded in adjacent tracks are displaced, or shifted from each other, in the manner shown in FIG. 7. It also will be assumed that the pilot signals are recorded during each horizontal blanking interval at the location represented in FIG. 6D. The video signal reproducing apparatus includes a luminance signal channel and a chrominance signal channel coupled to heads 1a, 1b. The luminance signal channel includes a high-pass filter 31, a limiter 33, a frequency demodulator 34 and a low-pass filter 35, all connected in series as shown, as is conventional. The chrominance signal channel includes a low-pass filter 32, a frequency re-converter 37 and a band-pass filter 38, all connected in series as shown, and as is conventional. An adding circuit 36 is coupled to the outputs of the luminance and chrominance signal channels so as to recombine the recovered luminance and chrominance components in order to reconstitute the composite color video signal for further application to an output terminal 39.

The reproducing apparatus illustrated in FIG. 8 is compatible with the recording apparatus described previously with respect to FIG. 5. Accordingly, if the recording apparatus includes merely a frequency modulator for modulating the composite video signal, that is, if separate luminance and chrominance signal channels are omitted in the recording apparatus, the reproducing apparatus likewise may include a frequency demodulator for demodulating the composite color video signal, thereby omitting the separate luminance and chrominance signal channels.

The apparatus for controlling the scanning trace of heads 1a, 1b, that is, the tracking-error correcting circuitry, is comprised of a horizontal synchronizing separator circuit 42, monostable multivibrators 43, 44 and 45, gate circuits 40 and 41, bandpass filters 46 and 47, level detectors 48 and 49 and a comparator 50. Horizontal synchronizing separator circuit 42 may be similar to aforedescribed horizontal synchronizing separator circuit 26 and is coupled to the output of the luminance signal channel so as to separate the horizontal synchronizing signal from the recovered luminance signal. The output of horizontal synchronizing separator circuit 42 is coupled in common to monostable multivibrators 43 and 45, with monostable multivibrator 43 being further coupled to monostable multivibrator 44. Monostable multivibrator 43 is responsive to the separated horizontal synchronizing signal for producing a pulse of predetermined duration. This pulse is applied to monostable multivibrator 44 which, in turn, is adapted to produce a gating pulse $P_1$. Depending upon the time constant of monostable multivibrator 43, it is appreciated that gating pulse $P_1$ is delayed from the separated horizontal synchronizing signal. In the embodiment described herein, this delay is slightly less than a horizontal line interval (1H) and, more particularly, is approximately equal to the delay between horizontal blanking interval $H_2$ and the next succeeding horizontal blanking interval $H_1$, shown in FIG. 7. Monostable multivibrator 45 is responsive to the separated horizontal synchronizing signal for producing a gating pulse $P_2$ at a time delayed from the start of the separated horizontal synchronizing signal. More particularly, gating pulse $P_2$ is adapted to be produced at a delayed time approximately corresponding to the delay between horizontal blanking interval $H_2$ and horizontal blanking interval $H_3$, shown in FIG. 7.

Gate circuits 40 and 41 have signal inputs connected in common to the output of the chrominance signal channel, these gate circuits being adapted to receive both the chrominance signal and the pilot signal which are transmitted through this chrominance signal channel. Gate circuit 40 includes a gating input adapted to receive gate pulse $P_1$; and gate circuit 41 similarly includes a gating input adapted to receive gate pulse $P_2$. The outputs of gate circuits 40 and 41 are coupled through band-pass filters 46 and 47, respectively, to level detectors 48 and 49, respectively. Level detectors 48 and 49 each are comprised of peak level detectors, such as envelope detectors, or the like, adapted to produce signals $E_1$ and $E_2$, respectively, which are a function of the signal level of the pilot signals applied thereto by band-pass filters 46 and 47. For this purpose, the pass-band of these band-pass filters preferably may be relatively narrow so as to pass substantially only the reproduced pilot signals. As will be described in greater detail below, these band-pass filters pass cross-talk components of the reproduced pilot signals.

Comparator 50 is adapted to compare the signal levels of the passed pilot signals and to produce an output voltage in accordance with the difference therebetween. Accordingly, the comparator may comprise a differential amplifier having a pair of inputs adapted to receive signals $E_1$ and $E_2$. The output of comparator 50 is used as the drive or deflection voltage V for application to the bi-morph assembly so as to correspondingly deflect or bend the head support assembly so as to adjust the transverse position of heads 1a, 1b relative to the record tracks as these heads traverse such tracks.

The operation of the reproducing apparatus shown in FIG. 8 now will be described. It is recalled that the frequency $f_p$ of the pilot signal which is recorded during the horizontal blanking intervals is less than the frequency band of the frequency-modulated luminance signal. Hence, during reproduction, the pilot signal is passed by low-pass filter 32 in the chrominance signal channel. In one embodiment, this pilot signal is frequency converted by a frequency reconverting signal whose frequency is $f_s$ so as to form a frequency-converted pilot signal of a frequency $(f_s - f_p)$. This frequency-converted pilot signal is passed through band-pass filter 38 and applied to adding circuit 36 as well as to gate circuits 40 and 41. If desired, suitable circuitry may be provided to prevent this frequency-converted pilot signal from being applied to the adding circuit.

In an alternative embodiment, the reproduced pilot signal which is passed by low-pass filter 32 merely is applied directly through a band-pass filter to gate circuits 40 and 41 without passing through a frequency converting circuit, such as frequency converter 37. In either embodiment, it is appreciated that a detectable pilot signal is applied to gate circuits 40 and 41. Also, in both embodiments, the pilot signal may be blocked so as not to be applied to adding circuit 36.

Let it first be assumed that head 1b scans track $T_{b1}$. Let it further be assumed that, since the length of the gap of this head is greater than the width of track $T_{b1}$, the head scans this track symmetrically, as shown in FIG. 7. This corresponds to a desired scanning trace and is assumed to be error-free. Since substantially equal portions of tracks $T_{a1}$ and $T_{a2}$ are scanned by head 1b, it may be appreciated that, as track $T_{b1}$ is scanned, cross-talk components of the pilot signals recorded in tracks $T_{a1}$ and $T_{a2}$ are recovered, which cross-talk components have substantially equal signal levels. When head 1b scans horizontal blanking interval $H_2$ on track $T_{b1}$, the horizontal blanking pulse and horizontal synchronizing pulse are reproduced. Since these signals had been recorded with the frequency-modulated luminance component, they are recovered at the output of low-pass filter 35 and are separated from the luminance component by horizontal synchronizing separator circuit 42. The separated signals trigger monostable multivibrator 43 which, in turn, triggers monostable multivibrator 44 to produce a gating pulse $P_1$. The time of occurrence of gating pulse $P_1$ is delayed from the reproduction of horizontal blanking interval $H_2$. In particular, if it is assumed that the pilot signal recorded during horizontal blanking interval $H_2$ is represented as signal $S_b$ shown in FIG. 9A, then gating pulse $P_1$ is delayed therefrom, as shown by pulses $P_1$ in FIG. 9B.

The separated horizontal synchronizing signal also triggers monostable multivibrator 45 to produce pulses $P_2$ as shown in FIG. 9C.

As head 1b scans track $T_{b1}$, first a cross-talk component of the pilot signal, designated $S_{a1}$, recorded in horizontal blanking interval $H_1$ is reproduced, then the pilot signal, designated as $S_b$, recorded in horizontal blanking interval $H_2$ is reproduced, and then the cross-talk component of the pilot signal, designated as $S_{a2}$, recorded in horizontal blanking interval $H_3$ is reproduced. The time and amplitude relationship between pilot signals $S_{a1}$, $S_b$ and $S_{a2}$ are shown in FIG. 9A. A comparison of FIGS. 9A-9C indicates that gating pulse $P_1$ substantially coincides with the cross-talk component of pilot signal $S_{a1}$, and gating pulse $P_2$ substantially coincides with the cross-talk component of pilot signal $S_{a2}$. However, no gating pulse is provided to coincide with pilot signal $S_b$. Accordingly, gate circuit 40 responds to gating pulse $P_1$ to extract the cross-talk component of pilot signal $S_{a1}$ from the reproduced video signals; and gate circuit 41 responds to gating pulse $P_2$ to extract the cross-talk component of pilot signal $S_{a1}$ from the reproduced video signal. The extracted pilot signals pass through band-pass filters 46 and 47 having signal levels $E_1$ and $E_2$, respectively, as shown in FIGS. 9D and 9E. These signal levels are detected by level detectors 48 and 49, respectively, and are compared in comparator 50. Since it is assumed that head 1b correctly scans track $T_{b1}$, signal level $E_1$ of the cross-talk component of pilot signal $S_{a1}$ is equal to signal level $E_2$ of the cross-talk component of pilot signal $S_{a2}$. Accordingly, the difference therebetween is substantially equal to zero. This means that comparator 50 applies a drive voltage of $V_O/2$ to the bi-morph assembly, whereby head 1b is not deflected during its scanning trace of track $T_{b1}$.

Let it now be assumed that head 1b deviates from its desired scanning trace in the manner represented by the left-most example shown in FIG. 7. Hence, head 1b deviates toward track $T_{a1}$ such that a greater portion of this track is scanned by the head than track $T_{a2}$. As described above, when the horizontal blanking intervals $H_2$ are scanned, horizontal synchronizing pulses are separated from the reproduced video signals, and monostable multivibrators 43, 44 and 45 are triggered so as to produce gating pulses $P_1$ and $P_2$, as shown in FIGS. 9B and 9C. Gating pulse $P_1$ actuates gate circuit 40 to gate the cross-talk component of pilot signal $S_{a1}$, recorded in track $T_{a1}$ and reproduced by head 1b. Similarly, gating pulse $P_2$ actuates gate circuit 41 so as to pass the cross-talk component of pilot signal $S_{a2}$ which is recorded in track $T_{a2}$ and is reproduced by head 1b. In view of the deviation of head 1b with respect to its desired scanning trace, the levels of the gated pilot signals, as passed through band-pass filters 46 and 47 are as shown in FIGS. 9D and 9E, respectively. Consequently, signal level $E_1$, detected by level detector 48, exceeds signal level $E_2$, detected by level detector 49. These detected signal levels are compared in comparator 50 and the difference therebetween is used to derive the drive voltage which is applied to the bi-morph assembly. As may be appreciated, this drive voltage is of a polarity and magntiude so as to deflect the bi-morph assembly in a direction whereby head 1b is restored to its desired scanning trace. That is, head 1b is deflected in a direction to minimize the tracking error. This means that the detected signal levels of the cross-talk pilot signals which are reproduced from tracks $T_{a1}$ and $T_{a2}$ become equal to each other.

Now let it be assumed that head 1b deviates from its desired scanning trace in the manner represented by the rightmost example shown in FIG. 7 wherein head 1b overlies a greater portion of track $T_{a2}$ than track $T_{a1}$. It is appreciated that, in accordance with this assumed tracking error, the level of the cross-talk component of pilot signal $S_{a1}$, which is recorded in track $T_{a1}$ and reproduced by head 1b, is less than the cross-talk component of pilot signal $S_{a2}$, recorded in track $T_{a2}$ and reproduced by head 1b. Comparator 50 senses that signal level $E_2$ exceeds signal level $E_1$ and applies a drive voltage to the bi-morph assembly having a magnitude and polarity which deflects the bi-morph assembly in a direction so as to restore head 1b to its correct scanning trace.

The relationship between the detected signal levels of the cross-talk components of the pilot signals which are recorded in tracks adjacent track $T_{b1}$ and the tracking error or deviation in head 1b as it scans track $T_{b1}$ is graphically depicted in FIG. 10 and particularly the solid lines shown therein. Thus, when signal level $E_1$ is equal to signal level $E_2$, the tracking error, or deviation, is equal to zero. When signal level $E_2$ exceeds signal level $E_1$, the tracking error is in one direction. Conversely, if signal level $E_1$ exceeds signal level $E_2$, the tracking error is in the opposite direction. As an alternative embodiment, the gap length of head 1b (and head 1a) may be equal to the width of a record track. With such a construction, it is appreciated that a cross-talk component can be recovered from only one of the adjacent tracks and not from both. That is, if head 1b traverses its correct scanning trace, no cross-talk component of the pilot signals will be reproduced, and $E_2 = E_1 = 0$. However, if a cross-talk component of a pilot signal is detected with a level equal to $E_2$, then a tracking error is present wherein head 1b overlaps with a portion of track $T_{a2}$. Conversely, if the cross-talk component of pilot signal $S_{a1}$ is reproduced with a signal level $E_1$, then head 1b overlaps with a portion of track $T_{a1}$. Hence, detected signal levels $E_2$ and $E_1$, which may be of opposite polarities, can be used to derive respective drive votlages to be applied to the bi-morph assembly so as to deflect head 1b in a direction to correct the tracking error. The relationship between signal levels $E_1$ and $E_2$ and the tracking error for the construction wherein the gap length of head 1b is substantially equal to the width of the record track is represented by the broken lines shown in FIG. 10. As may be appreciated, with this construction, a diode switching arrangement may be provided to selectively apply signals $E_1$ and $E_2$ to the bi-morph assembly as a drive voltage therefor; or, alternatively, comparator 50 may be used in a manner similar to that described hereinabove.

While the present invention has been particularly shown and described with reference to preferred embodiments and applications thereof, it should be readily apparent to one of ordinary skill in the art that various modifications in form and details may be made without departing from the spirit and scope of the invention. For example, although two scanning heads 1a, 1b have been described, it is appreciated that the tracking-error correcting technique disclosed herein is equally applicable to a recording/reproducing device employing only a single head, or to such a device employing more than two heads. Also, and with reference to FIG. 8, horizontal synchronizing separator circuit 42 has been shown as being connected to the output of low-pass filter 35 so as to receive the recovered, demodulated horizontal synchronizing signal. If desired, a suitable frequency detector or discriminator may be coupled to the output of limiter 33 and tuned to the particular frequency which represents the horizontal synchronizing signals. Such a frequency detector or discriminator can be used to trigger monostable multivibrators 43–45, in a manner similar to that described above. Still further, the pilot signal which is recorded during predetermined portions of the horizontal blanking intervals need not be generated solely by pilot signal oscillator 24 (FIG. 5). As an alternative, the burst signal which normally is provided on the back porch of the horizontal synchronizing signal can be used as the pilot signal. In such an alternative, the burst signal recorded in the displaced, or shifted horizontal blanking intervals $H_1$, $H_2$ and $H_3$ can be detected such that the signal levels of the cross-talk components of such burst signals may be used to represent the extent of the tracking error of the scanning head, this operation being performed in a manner quite similar to the foregoing operation discussed in conjunction with the embodiment shown in FIG. 8. Additionally, although the bi-morph assembly is preferred for the head support assembly, other adjustable head support structures can be used, if desired.

The present invention need not be limited only to an NTSC-type color video signal. Rather, the present invention is applicable to the PAL system and SECAM system as well. As mentioned previously, tracking-error correction can be attained if the recorded and reproduced video signals are monochrome signals.

Still further, the luminance and chrominance signal channels in both the recording and reproducing apparatus may be of the type wherein crosstalk components which are picked up from adjacent tracks are suppressed. For example, the azimuth angles of heads 1a and 1b may differ from each other so that a cross-talk component of the luminance signal picked up from an adjacent track is suppressed by reason of the attendant azimuth loss. Cross-talk components of the chrominance signal may be suppressed by providing different frequency-converting carriers in the recording apparatus, the frequencies of these carriers exhibiting an interleaved relationship. By using this technique, cross-talk components which are reproduced from adjacent tracks can be eliminated by providing a comb filter through which the reproduced chrominance components are passed.

Hence, it may be appreciated that tracking errors are detected during each horizontal line interval so that heads 1a and 1b can be suitably controlled so as to scan a correct trace across each record track during a reproducing operation. This tracking error correction system is of particular advantage when the width of each record track is reduced and the tape transport speed is of a relatively low value so as to increase the recording density, and thus the recording time, for the record medium.

It is, therefore, intended that the appended claims be interpreted as including all of the aforedescribed changes and modification, as well as various other such changes which will become apparent to one of ordinary skill in the art.

What is claimed is:

1. A method of recording tracking-error correcting signals added to a video signal on a record medium for use in detecting errors in the scanning path of a scanning transducer which scans parallel record tracks across said medium, comprising scanning successive record tracks across said medium to record periodic video signals in said record tracks, said video signals containing periodic horizontal synchronizing pulses; generating pilot signals during predetermined portions of the horizontal synchronizing signals in said video signals; and recording said pilot signals in said successive tracks such that the portion of a pilot signal in one track is shifted with respect to the position of a pilot signal in an adjacent track.

2. The method of claim 1 wherein a plurality of horizontal line intervals of said video signal is recorded in each record track on said record medium.

3. The method of claim 2 wherein the starting point of one track is displaced from the starting point of an adjacent track in the direction of scanning of said tracks by an amount to shift the positions of the horizontal synchronizing signals in said one track with respect to the positions of said horizontal synchronizing signals in said adjacent track.

4. The method of claim 1 wherein said video signals are color video signals containing luminance and chrominance components, periodic horizontal synchronizing signals, and burst signals; and wherein said burst signals constitute said pilot signals.

5. A method of correcting tracking-errors of a scanning transducer which scans successive parallel, adjacent record tracks of a record medium to reproduce video signals therefrom, said video signals including pilot signals recorded during predetermined portions of the horizontal blanking intervals of said video signals, said method comprising reproducing said video and pilot signals when said tracks are scanned, said reproduced pilot signals including the pilot signal recorded in the track being scanned by said transducer together with at least one cross-talk pilot signal recorded in at least one adjacent track; detecting said at least one cross-talk pilot signal; producing a control signal in response to the level of the detected cross-talk pilot signal; and adjusting the position of said transducer with respect to said track being scanned by said transducer as a function of said control signal.

6. The method of claim 5 wherein the level of the detected cross-talk pilot signal is proportional to the tracking error of said transducer relative to the track being scanned thereby; and wherein said position of said transducer is adjusted so as to vary said level of said detected cross-talk pilot signal in a direction to minimize said tracking error.

7. The method of claim 6, wherein another track is provided adjacent said track being scanned by said transducer; said step of reproducing includes reproducing another cross-talk pilot signal from said other adjacent track; said step of detecting includes detecting said other cross-talk pilot signal; and wherein said control signal is proportional to the levels of the first-mentioned and other pilot signals.

8. The method of claim 7 wherein said step of producing a control signal comprises generating first and second signals proportional to the peak levels of said first-mentioned and other pilot signals, respectively; comparing said first and second signals to each other; and producing said control signal as a function of the difference between said first and second signals.

9. The method of claim 8 wherein said step of detecting comprises sensing the horizontal blanking intervals reproduced during the scanning of a track; generating periodic gating pulses in response to said sensed horizontal blanking intervals; and gating the first-mentioned and other pilot signals from the reproduced video signals in response to said gating pulses.

10. The method of claim 9 wherein the horizontal blanking intervals recorded in one track are displaced from the horizontal blanking intervals recorded in adjacent tracks in the direction of scanning; and wherein said gating pulses are generated in time-displaced relation to each other such that a first set of gating pulses substantially coincides with the cross-talk pilot signals reproduced from one adjacent track and a second set of gating pulses substantially coincides with the cross-talk pilot signals reproduced from the other adjacent track.

11. The method of claim 5 wherein said video signals are color video signals containing luminance and chrominance components, periodic horizontal synchronizing signals, and burst signals; and wherein said burst signals constitute said predetermined signals.

12. Apparatus for recording tracking-error correcting signals on a record medium for use in detecting tracking errors in the scanning path of a transducer as said transducer scans said record medium to reproduce video signals recorded thereon, said video signals being recorded in successive, adjacent, parallel tracks wherein each track is provided with a plurality of horizontal blanking intervals with the horizontal blanking intervals of one track being offset with respect to the horizontal blanking intervals of an adjacent track, said apparatus comprising at least one transducer for recording said video signals onto said record medium; video signal processing means for supplying a video signal to said transducer for recording on said record medium; and means for supplying a pilot signal to said transducer during predetermined portions of said horizontal blanking intervals for recording on said record medium.

13. The apparatus of claim 12 wherein said means for supplying a pilot signal comprises an oscillator for producing a signal of predetermined frequency; horizontal synchronizing signal separating means for separating the horizontal synchronizing signal from said video signal; gating means coupled to said oscillator and responsive to said separated horizontal synchronizing signal for gating said signal of predetermined frequency; and means for applying said gated signal of predetermined frequency to said transducer.

14. The apparatus of claim 13, wherein said means for supplying comprises adder means having an input cooled to said video signal processing means, another input coupled to said gating means, and an output coupled to said transducer.

15. The apparatus of claim 12 wherein said video signal is a color video signal including luminance and chrominance components and a burst signal; and wherein said pilot signal is constituted by said burst signal.

16. Apparatus for correcting tracking errors in a video signal reproducing system of the type wherein at least one transducer scans successive, adjacent, parallel tracks on a record medium in which video signals including horizontal synchronizing signals are recorded, said video signals being provided with pilot signals recorded during certain portions of the horizontal blanking intervals of said video signals, said apparatus comprising:
    transducer means adapted for relative motion with respect to said record medium for reproducing the signals recorded in a given track together with a cross-talk component of at least the pilot signals recorded in an adjacent track;
    sensing means for sensing said cross-talk component of said pilot signals recorded in said adjacent track;
    level detecting means for detecting the level of said sensed cross-talk component of said pilot signals;
    control signal generating means for generating a control signal as a function of the detected level of said sensed cross-talk component of said pilot signals; and
    adjustable support means for said transducer means, said adjustable support means being responsive to said control signal to displace said transducer means transversely of said given track in accordance with said control signal and in a direction to restore said control signal to a quiescent value.

17. The apparatus of claim 16 wherein said transducer means comprise first and second transducers, each reproducing the signals recorded in alternate tracks together with the cross-talk components of the pilot signals recorded in both alternate tracks adjacent said given tracks; said sensing means senses the cross-talk components of said pilot signals reproduced from both adjacent tracks; said level detecting means detects the respective levels of the cross-talk components of said pilot signals reproduced from both adjacent tracks; and said control signal generating means generates said control signal as a function of the detected levels of the cross-talk components of said pilot signals reproduced from both adjacent tracks.

18. The apparatus of claim 17 wherein said control signal generating means comprise comparator means for receiving the respective detected levels of the cross-talk components of said pilot signals reproduced from both adjacent tracks and for generating said control signal in accordance with the difference therebetween.

19. The apparatus of claim 16 wherein the horizontal blanking intervals recorded in said given track are displaced with respect to the horizontal blanking intervals recorded in said adjacent track; and wherein said sensing means comprises horizontal synchronizing signal separating means for separating the horizontal synchronizing signals from the video signals reproduced from said given track, gate pulse generating means for generating gate pulses in response to said separated horizontal synchronizing signals, said gate pulses being in timed coincidence with the cross-talk components of the reproduced pilot signals, and gating means for receiving said reproduced video signals and responsive to said gate pulses to separate said cross-talk components of said pilot signals.

20. The apparatus of claim 19 wherein said video signals are color video signals including luminance and chrominance components and a burst signal; and wherein said pilot signals are constituted by said burst signal.

21. The apparatus of claim 16 wherein said adjustable support means comprises electrically responsive flexure means upon which said transducer means is mounted, said flexure means flexing in response to said control signal to displace said transducer means.

22. The apparatus of claim 21 wherein said flexure means is formed of piezo-electric material.

23. The apparatus of claim 22 wherein said piezo-electric material comprises a leaf assembly formed of two leaves of piezo-electric material, each having top and bottom surfaces provided with electrodes, the two leaves being in overlying relationship with each other.

24. The apparatus of claim 16 wherein said level detecting means comprises peak level detecting means for detecting the peak level of the cross-talk components of the reproduced pilot signals.

* * * * *